United States Patent
Bates et al.

(10) Patent No.: US 6,632,890 B1
(45) Date of Patent: *Oct. 14, 2003

(54) HYDROGENATED BLOCK COPOLYMER COMPOSITIONS

(75) Inventors: Frank S. Bates, St. Louis Park, MN (US); Chin Chu, Scotch Plains, NJ (US); Glenn H. Fredrickson, Santa Barbara, CA (US); Stephen F. Hahn, Midland, MI (US); Mary Ann Jones, Midland, MI (US); Jerry L. Hahnfeld, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 360 days.

This patent is subject to a terminal disclaimer.

(21) Appl. No.: 09/695,041

(22) Filed: Oct. 24, 2000

Related U.S. Application Data

(63) Continuation-in-part of application No. 09/511,332, filed on Feb. 23, 2000, now abandoned, which is a continuation-in-part of application No. 09/455,759, filed on Dec. 7, 1999, now abandoned, which is a continuation-in-part of application No. 09/330,520, filed on Jun. 11, 1999, now abandoned, which is a continuation-in-part of application No. 09/330,663, filed on Jun. 11, 1999, now abandoned.

(60) Provisional application No. 60/125,258, filed on Mar. 19, 1999, and provisional application No. 60/125,256, filed on Mar. 19, 1999.

(51) Int. Cl.[7] .................................................. C08F 8/04
(52) U.S. Cl. .............................. 525/332.8; 525/332.9; 525/333.1; 525/338; 525/339
(58) Field of Search .......................... 525/332.8, 332.9, 525/333.1

(56) References Cited

U.S. PATENT DOCUMENTS

| | | |
|---|---|---|
| 3,333,024 A | 7/1967 | Haefele et al. |
| 3,431,323 A | 3/1969 | Jones |
| 3,598,886 A | 8/1971 | Hoeg et al. |
| 3,644,588 A | 2/1972 | Hassell |
| 4,356,066 A | 10/1982 | Kienle et al. |
| 4,400,478 A | 8/1983 | Gergen et al. |
| 4,880,514 A | 11/1989 | Scott et al. |
| 4,965,114 A | 10/1990 | Ikeda et al. |
| 5,178,926 A | 1/1993 | Tanaka et al. |
| 5,189,110 A | 2/1993 | Ikematu et al. |
| 5,191,024 A | 3/1993 | Shibata et al. |
| 5,306,779 A | 4/1994 | Shibata et al. |
| 5,310,817 A | 5/1994 | Hergenrother et al. |
| 5,346,964 A | 9/1994 | Shibata et al. |
| 5,352,744 A | 10/1994 | Bates et al. |
| 5,635,114 A | 6/1997 | Hong |
| 5,828,043 A | 10/1998 | Nicoll et al. |
| 5,955,021 A | 9/1999 | Tiffany, III |
| 6,025,054 A | 2/2000 | Tiffany, III |

FOREIGN PATENT DOCUMENTS

| | | |
|---|---|---|
| CA | 912188 | 10/1972 |
| CN | 1263119 A | 8/2000 |
| EP | 505110 | 8/1996 |
| EP | 892393 | 1/1999 |
| JP | 63-125482 | 5/1988 |
| JP | 63-149845 | 6/1988 |
| JP | 1-253388 | 9/1989 |
| JP | 1-297845 | 11/1989 |
| JP | 2586575 | 5/1996 |
| JP | 2730053 | 3/1998 |
| JP | 11-286526 | 10/1999 |
| WO | WO 94/21694 | 9/1994 |
| WO | WO 96/34896 | 11/1996 |
| WO | WO 98/40883 | 9/1998 |
| WO | WO 99/23649 | 5/1999 |
| WO | WO 99/23650 | 5/1999 |
| WO | WO 99/23652 | 5/1999 |
| WO | WO 00/56783 | 9/2000 |

OTHER PUBLICATIONS

J.F. Pentleton, et al., *Polymer Preprint*, 1972, 13, (1), p. 427–432.
*Physics Today*, Feb. 1999, vol. 52, No. 2, pp. 32–38.
Gehlsen et al., *Mcromolecules*, vol. 26, 4122–4127, (1993).

Primary Examiner—Bernard Lipman

(57) ABSTRACT

The present invention relates to hydrogenated block copolymers of vinyl aromatic polymer blocks and conjugated diene polymer blocks having specific total Mn and specific block Mn's such that advantageous properties are attained. The present invention also relates to hydrogenated pentablock copolymers thereof and specifically hydrogenated pentablock copolymers useful in thin walled injection molding applications.

41 Claims, No Drawings

HYDROGENATED BLOCK COPOLYMER COMPOSITIONS

CROSS-REFERENCE STATEMENT

This application is a Continuation-in-part of U.S. application Ser. No. 09/511,332 filed on Feb. 23, 2000 now abandoned; which is a Continuation-in-part of U.S. application Ser. No. 09/455,759 filed on Dec. 7, 1999 now abandoned; which is a Continuation-in-part of U.S. application Ser. No. 09/330,520, filed Jun. 11, 1999 now abandoned; which claims the benefit of U.S. Provisional Application No. 60/125,258, filed Mar. 19, 1999; and is a Continuation-in part to U.S. application Ser. No. 09/330,663 filed Jun. 11, 1999 now abandoned, which claims the benefit of U.S. Provisional Application No. 60/125,256 filed on Mar. 19, 1999.

BACKGROUND OF THE INVENTION

The present invention relates to hydrogenated block copolymers. In particular, the invention relates to hydrogenated block copolymers prepared from vinyl aromatic and conjugated diene monomers. Among the most common are those prepared from a vinyl aromatic monomer, such as styrene; and a conjugated diene, such as butadiene or isoprene. Such block copolymers have been hydrogenated to further differentiate the range of physical properties and the oxidative stability. Hydrogenation of the polymerized conjugated diene block can be achieved alone or in combination with hydrogenation of the aromatic ring of the polymerized vinyl aromatic monomer. Depending on hydrogenation conditions and the catalyst employed, it is possible to hydrogenate the conjugated diene polymer portion of the block copolymer without substantially affecting the vinyl aromatic polymer block, or to substantially saturate both block types.

Fully hydrogenated block copolymers prepared from vinyl aromatic and conjugated diene monomers, wherein both blocks are substantially saturated, are well known in the art. U.S. Pat. Nos. 3,333,024 and 3,431,323 disclose hydrogenated triblock (ABA) copolymers of vinyl aromatic and conjugated diene polymers having a 20 to 30 percent hydrogenation level and improved tensile properties, when compared to their non-hydrogenated counterparts. However, such copolymers containing very low molecular weight hydrogenated polystyrene blocks, e.g. 4,000, have low heat resistance and do not afford rigid compositions with good physical properties. U.S. Pat. No. 3,598,886 discloses hydrogenated vinyl substituted aromatic hydrocarbon-conjugated diene block copolymers having less than 3 percent aromatic unsaturation, however the compositions disclosed do not have a good balance of physical properties and processability. Moreover, *Thermoplastic Elastomers*, Chapter 14, Ed. N. R. Legge, et al., Hanser Publishers, New York, 1987 discloses that fully hydrogenated block copolymers have generally poor physical properties at only slightly elevated temperatures.

U.S. Pat. No. 4,911,966 issued to Mitsubishi discloses hydrogenated vinyl aromatic polymers and copolymers and their use in optical media applications. However, the broad composition disclosed suffer from numerous disadvantages including high birefringence, poor processability and poor dimensional stability in such applications.

Therefore, it remains desirable to obtain a hydrogenated block copolymer, wherein the block copolymer is prepared from a vinyl aromatic monomer and a conjugated diene monomer, having improved physical properties and retention of these properties at elevated temperatures.

SUMMARY OF THE INVENTION

In a first aspect, the present invention is a hydrogenated block copolymer comprising at least two distinct blocks of hydrogenated polymerized vinyl aromatic monomer, herein referred to as hydrogenated vinyl aromatic polymer blocks, and at least one block of hydrogenated polymerized conjugated diene monomer, herein referred to as hydrogenated conjugated diene polymer block, wherein the hydrogenated copolymer is characterized by:

a) a total number average molecular weight ($Mn_t$) of from 30,000 to 120,000, wherein each hydrogenated vinyl aromatic polymer block (A) has a $Mn_a$ of from 5,000 to 50,000 and each hydrogenated conjugated diene polymer block (B) has a $Mn_b$ of from 4,000 to 110,000; and b) a hydrogenation level such that each hydrogenated vinyl aromatic polymer block has a hydrogenation level of greater than 90 percent and each hydrogenated conjugated diene polymer block has a hydrogenation level of greater than 95 percent.

Hydrogenated block copolymers of the first aspect of the present invention having these Mn and hydrogenation characteristics are transparent to light at visible wavelengths and are ideally suited for conventional manufacturing applications, while possessing excellent properties at both standard and elevated temperatures. It has been discovered that hydrogenated copolymers having both the high hydrogenation levels and Mn limitations, as defined by the hydrogenated copolymers of the present invention, have superior properties and processability characteristics, compared to the hydrogenated copolymers of the prior art. The combination of transparency, high glass transition temperature, low water absorption, and excellent melt processability makes these materials ideal candidates for many applications including fabricated articles, thermoformed articles, extruded articles, injection molded articles, films, and foams.

In a second aspect, the present invention is a hydrogenated pentablock copolymer prepared by hydrogenating a pentablock copolymer produced from at least one vinyl aromatic monomer and at least one conjugated diene monomer, wherein the hydrogenated pentablock copolymer has a total number average molecular weight ($Mn_t$) of from 30,000 to 200,000 and is of the structure ABABA, and wherein each vinyl aromatic polymer block (A) has a $Mn_a$ of from 10,000 to 100,000 and is hydrogenated to greater than 90 percent and each conjugated diene polymer block (B) has a $Mn_b$ of from 2,000 to 50,000 and is hydrogenated to greater than 95 percent.

The hydrogenated pentablock copolymers of the second aspect of the present invention having these Mn and hydrogenation characteristics, have superior properties and processability characteristics when compared to other hydrogenated block and pentablock copolymers. The hydrogenated pentablock copolymers of the present invention also exhibit higher resistance to yield, and improved impact strength. In addition, the pentablocks exhibit lower melt viscosity compared to the conventional hydrogenated diblock and triblock copolymers at identical molecular weights.

The hydrogenated pentablock copolymers of the second aspect of the present invention can be used in various applications including fabricated articles, thermoformed articles, injection molded articles, extruded articles, foams, films and the like.

In a third aspect, the present invention is a hydrogenated pentablock copolymer prepared by hydrogenating a pentablock copolymer produced from at least one vinyl aromatic monomer and at least one conjugated diene monomer, wherein the hydrogenated pentablock copolymer has a total number average molecular weight (Mn$_t$) of from 40,000 to 70,000 and is of the structure ABABA, and wherein each vinyl aromatic polymer block (A) has a Mn$_a$ of from 8,700 to 21,000 and is hydrogenated to greater than 90 percent, and each conjugated diene polymer block (B) has a Mn$_b$ of from 2,000 to 12,500, further characterized in that the total amount of B blocks is from 10 to 35 weight percent of the copolymer based on the combined weights of all A and B blocks, and is hydrogenated to greater than 95 percent, while block A is hydrogenated to at least 90 percent.

The hydrogenated pentablock copolymers of the third aspect of the present invention having these Mn, block content and hydrogenation characteristics, have superior now abandoned properties and processability characteristics when compared to other block and pentablock copolymers, especially in thin wall injection molding applications such as optical media discs. These hydrogenated pentablock copolymers also exhibit higher resistance to yield, and improved toughness. In addition, these pentablocks exhibit lower melt viscosity compared to the conventional hydrogenated diblock and triblock copolymers at identical molecular weights.

The hydrogenated pentablock copolymers of the third aspect of the present invention are advantageously used in thin wall injection molded applications, such as optical media discs due to their excellent processability, birefringence, dimensional stability and other physical properties.

DESCRIPTION OF THE PREFERRED EMBODIMENTS

The present invention relates to hydrogenated block copolymers obtained by hydrogenating a block copolymer produced from at least one vinyl aromatic monomer and at least one conjugated diene monomer.

The vinyl aromatic monomer is typically a monomer of the formula:

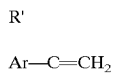

wherein R' is hydrogen or alkyl, Ar is phenyl, halophenyl, alkylphenyl, alkylhalophenyl, naphthyl, pyridinyl, or anthracenyl, wherein any alkyl group contains 1 to 6 carbon atoms which may be mono or multisubstituted with functional groups such as halo, nitro, amino, hydroxy, cyano, carbonyl and carboxyl. More preferably Ar is phenyl or alkyl phenyl with phenyl being most preferred. Typical vinyl aromatic monomers include styrene, alpha-methylstyrene, all isomers of vinyl toluene, especially paravinyltoluene, all isomers of ethyl styrene, propyl styrene, butyl styrene, vinyl biphenyl, vinyl naphthalene, vinyl anthracene and the like, and mixtures thereof. The block copolymer can contain more than one specific polymerized vinyl aromatic monomer. For instance, the block copolymer can contain a polystyrene block and a poly-alpha-methylstyrene block. The hydrogenated vinyl aromatic polymer block may also be a copolymer of a vinyl aromatic wherein the vinyl aromatic portion is at least 50 weight percent of the copolymer.

The conjugated diene monomer can be any monomer having 2 conjugated double bonds. Such monomers include for example 1,3-butadiene, 2-methyl-1,3-butadiene, 2-methyl-1,3 pentadiene, isoprene and similar compounds, and mixtures thereof. In the case of multiblock copolymers containing more than one conjugated diene block, the block copolymer can contain more than one specific polymerized conjugated diene monomer. In other words, a pentablock copolymer can contain both a polybutadiene block and a polyisoprene block.

The conjugated diene polymer block can be chosen from materials which remain amorphous after the hydrogenation process, or materials which are capable of crystallization after hydrogenation. Hydrogenated polyisoprene blocks remain amorphous, while hydrogenated polybutadiene blocks can be either amorphous or crystallizable depending upon their structure. Polybutadiene can contain either a 1,2 configuration, which hydrogenates to give the equivalent of a 1-butene repeat unit, or a 1,4-configuration, which hydrogenates to give the equivalent of an ethylene repeat unit. Polybutadiene blocks having at least approximately 40 weight percent 1,2-butadiene content, based on the weight of the polybutadiene block, provides substantially amorphous blocks with low glass transition temperatures upon hydrogenation. Polybutadiene blocks having less than approximately 40 weight percent 1,2-butadiene content, based on the weight of the polybutadiene block, provide crystalline blocks upon hydrogenation. Depending on the final application of the polymer it may be desirable to incorporate a crystalline block (to improve solvent resistance) or an amorphous, more compliant block. The conjugated diene polymer block may also be a copolymer of a conjugated diene, wherein the conjugated diene portion of the copolymer is at least 50 weight percent of the copolymer.

Other polymeric blocks may also be included in the hydrogenated block copolymers of the present invention.

The hydrogenated block copolymers of the first aspect of the present invention are produced by the hydrogenation of block copolymers including triblock, multiblock, tapered block, and star block copolymers such as SBS, SBSBS, SIS, SISIS, SISBS and the like (wherein S is polystyrene, B is polybutadiene and I is polyisoprene). The block copolymers contain at least one triblock segment comprised of a vinyl aromatic polymer block on each end. The block copolymers may, however, contain any number of additional blocks, wherein these blocks may be attached at any point to the triblock polymer backbone. Thus, linear blocks would include for example SBS, SBSB, SBSBS, SBSBSB, and the like. The copolymer can also be branched, wherein polymer chains are attached at any point along the copolymer backbone.

A block is herein defined as a polymeric segment of a copolymer which exhibits microphase separation from a structurally or compositionally different polymeric segment of the copolymer. Microphase separation occurs due to the incompatibility of the polymeric segments within the block copolymer. Microphase separation and block copolymers are widely discussed in "Block Copolymers-Designer Soft Materials", PHYSICS TODAY, February, 1999, pages 32–38.

In the first aspect of the present invention the hydrogenated block copolymers typically contain from 1 to 99 weight percent of a hydrogenated vinyl aromatic polymer, e.g. polyvinylcyclohexane or PVCH block, generally from 10, preferably from 15, more preferably from 20, even more preferably from 25, and most preferably from 30 to 90 weight percent, preferably to 85 and most preferably to 80 percent, based on the total weight of the hydrogenated block copolymer.

The hydrogenated block copolymers of the first aspect of the present invention typically contain from 1 to 99 weight percent of a hydrogenated conjugated diene polymer, preferably from 10, more preferably from 15, and most preferably from 20 to 90 weight percent, typically to 85, preferably to 80, more preferably to 75, even more preferably to 70 and most preferably to 65 percent, based on the total weight of the hydrogenated block copolymer.

In applications where properties such as high modulus are important, the copolymer will contain at least 65 weight percent of a hydrogenated vinyl aromatic polymer block. In applications where an elastomer is preferred, the copolymer will contain at least 60 weight percent of a hydrogenated conjugated diene polymer block.

The total number average molecular weight ($Mn_t$) of the hydrogenated block copolymers of the first aspect of the present invention is typically from 30,000, preferably from 40,000, more preferably from 45,000 and most preferably from 50,000 to 120,000, typically to 100,000, generally to 95,000, preferably to 90,000, more preferably to 85,000, and most preferably to 80,000. Number average molecular weight (Mn) as referred to throughout this application is determined using gel permeation chromatography (GPC). The molecular weight of the hydrogenated block copolymer and properties obtained are dependent upon the molecular weight of each of the hydrogenated polymeric blocks. It has been discovered that by optimizing the molecular weight of the hydrogenated polymeric blocks, hydrogenated block copolymers of low molecular weight (30,000 to 120,000) can achieve high heat distortion temperatures and excellent toughness and tensile strength properties. Surprisingly, we have found that good physical properties can be obtained at relatively low hydrogenated block copolymer molecular weights which gives superior processability.

Typical number average molecular weight values ($Mn_a$) for each hydrogenated vinyl aromatic polymer block in the first aspect of the present invention are from 5,000, preferably from 10,000, more preferably from 13,000 and most preferably from 15,000 to 50,000, preferably to 45,000, more preferably to 40,000 and most preferably to 35,000. In general, the optimum $Mn_a$ for a hydrogenated polystyrene block in the hydrogenated block copolymer of the first aspect of the present invention is from 7,000 to 45,000.

The molecular weight ($Mn_b$) of each hydrogenated conjugated diene polymer block is typically lower than that of the hydrogenated vinyl aromatic polymer block when a high modulus, rigid polymer is desired. When a low modulus elastomeric polymer is desired, the $Mn_b$ of the hydrogenated diene polymer block can be higher than the hydrogenated vinyl aromatic polymer block. The $Mn_b$ of the hydrogenated diene polymer block is typically from 4,000, preferably from 5,000, more preferably from 8,000 and most preferably from 10,000 to 110,000, preferably to 90,000, more preferably to 55,000 and most preferably to 30,000.

The Mn of the hydrogenated blocks will also depend upon the properties desired in the hydrogenated block copolymer produced. If rigid hydrogenated block copolymers are desired, the $Mn_a$ of the hydrogenated vinyl aromatic polymer block will typically be from 10,000, preferably from 12,000, more preferably from 15,000 and most preferably from 20,000 to 50,000, preferably to 45,000, more preferably to 43,000 and most preferably to 40,000; while the $Mn_b$ of the hydrogenated diene polymer block will typically be from 4,000, preferably from 8,000, more preferably from 10,000, and most preferably from 12,000 to 30,000, preferably to 28,000, most preferably to 25,000 and most preferably to 22,000. If elastomeric hydrogenated block copolymers are desired, the $Mn_a$ of the hydrogenated vinyl aromatic polymer block will typically be from 5,000, preferably from 5,500, more preferably from 6,000, and most preferably from 7,000 to 20,000, preferably to 18,000, more preferably to 16,500 and most preferably to 15,000; while the $Mn_b$ of the hydrogenated diene polymer block will typically be from 35,000, preferably from 38,000, more preferably from 40,000 and most preferably from 45,000 to 110,000, preferably to 100,000, more preferably to 90,000 and most preferably to 80,000. Flexible type hydrogenated block copolymers can be achieved by using Mn's somewhere in between the rigid and elastomeric values.

The hydrogenated pentablock copolymer of the second aspect of the present invention typically contains the same weight percent of hydrogenated vinyl aromatic polymer and hydrogenated conjugated diene polymer as taught in the first aspect of the present invention.

The total $Mn_t$ of the hydrogenated pentablock copolymers of the second aspect of the present invention is typically from 30,000, preferably from 40,000, more preferably from 50,000 and most preferably from 60,000 to 200,000, typically to 150,000, generally to 120,000, preferably to 100,000, more preferably to 90,000, and most preferably to 80,000. The molecular weight of the hydrogenated pentablock copolymer and properties obtained are dependent upon the molecular weight of each of the hydrogenated polymeric blocks. It has been discovered that by optimizing the molecular weight of the hydrogenated polymeric blocks, hydrogenated block copolymers of low molecular weight (30,000 to 200,000) can achieve high heat distortion temperatures and excellent toughness and tensile strength properties. Surprisingly, we have found that good physical properties can be obtained at relatively low hydrogenated block copolymer molecular weight which gives superior processability.

Typical $Mn_a$ values for each hydrogenated vinyl aromatic polymer block of the hydrogenated pentablocks of the second aspect are from 10,000, preferably from 12,000, more preferably from 13,000 and most preferably from 15,000 to 100,000, preferably to 90,000, more preferably to 80,000 and most preferably to 70,000.

In general, the optimum $Mn_a$ for a hydrogenated polystyrene block in the hydrogenated pentablock copolymer of the second aspect of the present invention is from 14,000 to 60,000.

The molecular weight of each hydrogenated conjugated diene polymer block is typically lower than that of the hydrogenated vinyl aromatic polymer block when a high modulus, rigid polymer is desired. When a low modulus elastomeric polymer is desired, the molecular weight of the hydrogenated diene polymer block can be higher than the hydrogenated vinyl aromatic polymer block. The $Mn_b$ of each hydrogenated diene polymer block is typically from 2,000, preferably from 3,000, more preferably from 4,000 and most preferably from 5,000 to 50,000, preferably to 40,000, more preferably to 35,000 and most preferably to 30,000.

In a third aspect of the present invention, the hydrogenated pentablock copolymer typically contains from 65 to 90 weight percent of a hydrogenated vinyl aromatic polymer, e.g. polyvinylcyclohexane or PVCH block, preferably from 70 to 85 percent, based on the total weight of the hydrogenated pentablock copolymer.

The hydrogenated pentablock copolymers of the third aspect of the present invention typically contain from 10 to 35 weight percent of a hydrogenated conjugated diene polymer, preferably from 11, more preferably from 13, and most preferably from 15 to 34 weight percent, typically to 33, preferably to 32, more preferably to 31, and most preferably to 30 percent, based on the total weight of the hydrogenated pentablock copolymer.

The $Mn_t$ of the hydrogenated pentablock copolymers of the third aspect of the present invention is typically from 40,000, preferably from 42,000, more preferably from 46,000 and most preferably from 50,000 to 70,000. The molecular weight of the hydrogenated pentablock copolymer and properties obtained are dependent upon the molecular weight of each of the hydrogenated polymeric blocks. It has been discovered that by optimizing the molecular weight of the hydrogenated polymeric blocks, hydrogenated block copolymers of low molecular weight (40,000 to 70,000) can achieve high heat distortion temperatures and excellent toughness and tensile strength properties. Surprisingly, we have found that good physical properties can be obtained at relatively low hydrogenated block copolymer molecular weight which gives superior processability.

Typical $Mn_a$ values for each hydrogenated vinyl aromatic polymer block are from 10,000, preferably from 11,000 to 50,000, preferably to 40,000, more preferably to 30,000 and most preferably to 20,000.

The molecular weight ($Mn_b$) of each hydrogenated diene polymer block is typically from 2,000, preferably from 2,500, more preferably from 3,000 and most preferably from 3,750 to 20,000, preferably to 15,000, more preferably to 12,000 and most preferably to 10,500.

It should be noted that good properties are obtained in all aspects of the present invention at hydrogenated vinyl aromatic polymer molecular weights which are lower than the entanglement molecular weight of the hydrogenated vinyl aromatic polymer. It is generally accepted in the art that the weight average molecular weight of a polymer must far exceed the entanglement molecular weight in order to achieve acceptable properties. The entanglement molecular weight of a polymer is associated with the chain length required for a given polymer to show a dramatic increase in melt viscosity due to chain entanglements. The entanglement molecular weights for many common polymers have been measured and reported in *Macromolecules*, 1994, Volume 27, page 4639. It is commonly observed for glassy polymers that maximum values of strength and toughness are achieved at about 10 times the entanglement molecular weight (see for instance Styrene Polymers in the Encyclopedia of Polymer Science and Engineering, 2nd edition, Volume 16, pages 62–71, 1989). The entanglement molecular weight is approximately 38,000 for polyvinylcyclohexane. It has been determined that an optimum balance of properties and processability can be obtained at hydrogenated vinyl aromatic polymer block molecular weights (Mn) of less than 0.6 times the entanglement molecular weight of a hydrogenated vinyl aromatic polymer. The molecular weight of each hydrogenated conjugated diene polymer block is typically lower than that of the hydrogenated vinyl aromatic polymer block when a high modulus, rigid polymer is desired.

It is important to note that each individual block of the hydrogenated block copolymers can have its own distinct Mn. In other words, for example, the hydrogenated vinyl aromatic polymer blocks within the hydrogenated block copolymer of the present invention may each have a different Mn.

Methods of making block copolymers are well known in the art. Typically, block copolymers are made by anionic polymerization, examples of which are cited in *Anionic Polymerization: Principles and Practical Applications*, H. L. Hsieh and R. P. Quirk, Marcel Dekker, New York, 1996. In one embodiment, block copolymers are made by sequential monomer addition to a carbanionic initiator such as sec-butyl lithium or n-butyl lithium. In another embodiment, a pentablock copolymer is made by coupling a triblock material with a divalent coupling agent such as 1,2-dibromoethane, dichlorodimethylsilane, or phenylbenzoate. In this embodiment, a small chain (less than 10 monomer repeat units) of a conjugated diene polymer can be reacted with the vinyl aromatic polymer coupling end to facilitate the coupling reaction. Vinyl aromatic polymer blocks are typically difficult to couple, therefore, this technique is commonly used to achieve coupling of the vinyl aromatic polymer ends. The small chain of diene polymer does not constitute a distinct block since no microphase separation is achieved. The coupled structure achieved by this method is considered to be the functional equivalent of the ABABA pentablock copolymer structure. Coupling reagents and strategies which have been demonstrated for a variety of anionic polymerizations are discussed in Hsieh and Quirk, Chapter 12, pgs. 307–331. In another embodiment, a difunctional anionic initiator is used to initiate the polymerization from the center of the block system, wherein subsequent monomer additions add equally to both ends of the growing polymer chain. An example of a such a difunctional initiator is 1,3-bis(1-phenylethenyl) benzene treated with organolithium compounds, as described in U.S. Pat. Nos. 4,200,718 and 4,196,154 which are herein incorporated by reference.

After preparation of the block copolymer, the copolymer is hydrogenated to remove sites of unsaturation in both the conjugated diene polymer block and the vinyl aromatic polymer block segments of the copolymer. Any method of hydrogenation can be used and such methods typically include the use of metal catalysts supported on an inorganic substrate, such as Pd on $BaSO_4$ (U.S. Pat. No. 5,352,744) and Ni on kieselguhr (U.S. Pat. No. 3,333,024, both of which are incorporated herein by reference). Additionally, soluble, homogeneous catalysts such as those prepared from combinations of transition metal salts of 2-ethylhexanoic acid and alkyl lithiums can be used to fully saturate block copolymers, as described in *Die Makromolekulare Chemie*, volume 160, pp 291, 1972. The copolymer hydrogenation can also be achieved using hydrogen and a heterogeneous catalyst such as those described in U.S. Pat. No. 5,352,744, U.S. Pat. No. 5,612,422 and U.S. Pat. No. 5,645,253, which are herein incorporated by reference. The catalysts described therein are heterogeneous catalysts consisting of a metal crystallite supported on a porous silica substrate. An example of a silica supported catalyst which is especially useful in the polymer hydrogenation is a silica which has a surface area of at least 10 $m^2/g$ which is synthesized such that it contains pores with diameters ranging between 3000 and 6000 angstroms. This silica is then impregnated with a metal capable of catalyzing hydrogenation of the polymer, such as nickel, cobalt, rhodium, ruthenium, palladium, platinum, other Group VIII metals, combinations or alloys thereof. Other heterogeneous catalysts can also be used, having a diameter in the range of from 500 to 3,000 angstroms.

Alternatively, the hydrogenation can be conducted in the presence of a mixed hydrogenation catalyst characterized in that it comprises a mixture of at least two components. The first component comprises any metal which will increase the rate of hydrogenation and includes nickel, cobalt, rhodium, ruthenium, palladium, platinum, other Group VIII metals, or combinations thereof. Preferably rhodium and/or platinum is used. However, platinum is known to be a poor hydrogenation catalyst for nitrites, therefore, platinum would not be preferred in the hydrogenation of nitrile copolymers. The second component used in the mixed hydrogenation catalyst comprises a promoter which inhibits deactivation of the Group VIII metal(s) upon exposure to polar materials, and is herein referred to as the deactivation resistant component. Such components preferably comprise rhenium, molybdenum, tungsten, tantalum or niobium or mixtures thereof.

The amount of the deactivation resistant component in the mixed catalyst is at least an amount which significantly inhibits the deactivation of the Group VIII metal component when exposed to polar impurities within a polymer composition, herein referred to as a deactivation inhibiting amount. Deactivation of the Group VIII metal is evidenced by a significant decrease in hydrogenation reaction rate. This is exemplified in comparisons of a mixed hydrogenation catalyst and a catalyst containing only a Group VIII metal component under identical conditions in the presence of a polar impurity, wherein the catalyst containing only a Group VIII metal component exhibits a hydrogenation reaction rate which is less than 75 percent of the rate achieved with the mixed hydrogenation catalyst.

Preferably, the amount of deactivation resistant component is such that the ratio of the Group VIII metal component to the deactivation resistant component is from 0.5:1 to 10:1, more preferably from 1:1 to 7:1, and most preferably from 1:1 to 5:1.

The mixed catalyst can consist of the components alone, but preferably the catalyst additionally comprises a support on which the components are deposited. In one embodiment, the metals are deposited on a support such as a silica, alumina or carbon. In a more specific embodiment, a silica support having a narrow pore size distribution and surface area greater than 10 meters squared per gram ($m^2/g$) is used.

The pore size distribution, pore volume, and average pore diameter of the support can be obtained via mercury porosimetry following the proceedings of ASTM D-4284-83.

The pore size distribution is typically measured using mercury porosimetry. However, this method is only sufficient for measuring pores of greater than 60 angstroms. Therefore, an additional method must be used to measure pores less than 60 angstroms. One such method is nitrogen desorption according to ASTM D-4641-87 for pore diameters of less than about 600 angstroms. Therefore, narrow pore size distribution is defined as the requirement that at least 98 percent of the pore volume is defined by pores having pore diameters greater than 300 angstroms and that the pore volume measured by nitrogen desorption for pores less than 300 angstroms, be less than 2 percent of the total pore volume measured by mercury porosimetry.

The surface area can be measured according to ASTM D-3663-84. The surface area is typically between 10 and 100 $m^2/g$, preferably between 15 and 90 with most preferably between 50 and 85 $m^2/g$.

The desired average pore diameter of the support for the mixed catalyst is dependent upon the polymer which is to be hydrogenated and its molecular weight (Mn). It is preferable to use supports having higher average pore diameters for the hydrogenation of polymers having higher molecular weights to obtain the desired amount of hydrogenation. For high molecular weight polymers (Mn>200,000 for example), the typical desired surface area can vary from 15 to 25 m /g and the desired average pore diameter from 3,000 to 4000 angstroms. For lower molecular weight polymers (Mn<100,000 for example), the typical desired surface area can vary from 45 to 85 m2/and the desired average pore diameter from 300 to 700 angstroms.

Silica supports are preferred and can be made by combining potassium silicate in water with a gelation agent, such as formamide, polymerizing and leaching as exemplified in U.S. Pat. No. 4,112,032. The silica is then hydrothermally calcined as in Iler, R. K., *The Chemistry of Silica*, John Wiley and Sons, 1979, pp. 539–544, which generally consists of heating the silica while passing a gas saturated with water over the silica for about 2 hours or more at temperatures from about 600° C. to about 850° C. Hydrothermal calcining results in a narrowing of the pore diameter distribution as well as increasing the average pore diameter. Alternatively, the support can be prepared by processes disclosed in Iler, R. K., *The Chemistry of Silica*, John Wiley and Sons, 1979, pp. 510–581.

A silica supported catalyst can be made using the process described in U.S. Pat. No. 5,110,779, which is incorporated herein by reference. An appropriate metal, metal component, metal containing compound or mixtures thereof, can be deposited on the support by vapor phase deposition, aqueous or nonaqueous impregnation followed by calcination, sublimation or any other conventional method, such as those exemplified in *Studies in Surface Science and Catalysis*, "Successful Design of Catalysts" V.44, pg. 146–158, 1989 and *Applied Heterogeneous Catalysis* pgs. 75–123, Institute Francais du Pétrole Publications, 1987. In methods of impregnation, the appropriate metal containing compound can be any compound containing a metal, as previously described, which will produce a usable hydrogenation catalyst which is resistant to deactivation. These compounds can be salts, coordination complexes, organometallic compounds or covalent complexes.

Typically, the total metal content of the mixed supported catalyst is from 0.1 to 10 wt. percent based on the total weight of the silica supported catalyst. Preferable amounts are from 2 to 8 wt. percent, more preferably 0.5 to 5 wt. percent based on total catalyst weight.

Promoters, such as alkali, alkali earth or lanthanide containing compounds, can also be used to aid in the dispersion of the metal component onto the silica support or stabilization during the reaction, though their use is not preferred.

The amount of mixed supported catalyst used in the hydrogenation process is much smaller than the amount required in conventional unsaturated polymer hydrogenation reactions due to the high reactivity of the hydrogenation catalysts. Generally, amounts of less than 1 gram of supported catalyst per gram of unsaturated polymer are used, with less than 0.1 gram being preferred and less than 0.05 being more preferred. The amount of supported catalyst used is dependent upon the type of process, whether it is continuous, semi-continuous or batch, and the process conditions, such as temperature, pressure and reaction time wherein typical reaction times may vary from about 5 minutes to about 5 hours. Continuous operations can typically contain 1 part by weight supported catalyst to 200,000 or more parts unsaturated polymer, since the supported catalyst is reused many times during the course of continuous operation. Typical batch processes can use 1 part by weight supported catalyst to 5,000 parts unsaturated polymer. Higher temperatures and pressures will also enable using smaller amounts of supported catalyst.

The hydrogenation reaction can be conducted in the absence of a solvent but is preferably conducted in a hydrocarbon solvent in which the polymer is soluble and which will not hinder the hydrogenation reaction. Preferably the solvent is a saturated solvent such as cyclohexane, methylcyclohexane, ethylcyclohexane, cyclooctane, cycloheptane, dodecane, dioxane, diethylene glycol dimethyl ether, tetrahydrofuran, isopentane, decahydronaphthalene or mixtures thereof, with cyclohexane being the most preferred.

The temperature at which the hydrogenation is conducted can be any temperature at which hydrogenation occurs without significant degradation of the polymer. Degradation of the polymer can be detected by a decrease in Mn, an increase in polydispersity or a decrease in glass transition temperature, after hydrogenation. Significant degradation in polymers having a polydispersity between 1.0 and about 1.2 can be defined as an increase of 30 percent or more in polydispersity after hydrogenation. Preferably, polymer degradation is such that less than a 20 percent increase in polydispersity occurs after hydrogenation, most preferably less than 10 percent. In polymers having polydispersity greater than about 1.2, a significant decrease in molecular weight after hydrogenation indicates that degradation has occurred. Significant degradation in this case is defined as a decrease in Mn of 20 percent or more. Preferably, a Mn decrease after hydrogenation will be less than 10 percent. However, polymers such as poly-alpha-methylstyrene or other alpha substituted vinyl aromatic polymers which are more prone to polymer degradation, can tolerate a decrease in Mn of up to 30 percent.

Typical hydrogenation temperatures are from about 40° C. preferably from about 100° C., more preferably from about 110° C., and most preferably from about 120° C. to about 250° C., preferably to about 200° C., more preferably to about 180° C., and most preferably to about 170° C.

The pressure of the hydrogenation reaction is not critical, though hydrogenation rates increase with increasing pressure. Typical pressures range from atmospheric pressure to 70 MPa, with 0.7 to 10.3 MPa being preferred.

The hydrogenation reaction vessel is purged with an inert gas to remove oxygen from the reaction area. Inert gases include but are not limited to nitrogen, helium, and argon, with nitrogen being preferred.

The hydrogenating agent can be any hydrogen producing compound which will efficiently hydrogenate the unsaturated polymer. Hydrogenating agents include, but are not limited, to hydrogen gas, hydrazine and sodium borohydride. In a preferred embodiment, the hydrogenating agent is hydrogen gas.

The level of hydrogenation of the block copolymers of the present invention is preferably greater than 95 percent of the conjugated diene polymer block and greater than 90 percent of the vinyl aromatic polymer block segments, more preferably greater than 99 percent of the conjugated diene polymer block and greater than 95 percent of the vinyl aromatic polymer block segments, even more preferably greater than 99.5 percent of the conjugated diene polymer block and greater than 98 percent of the vinyl aromatic polymer block segments, and most preferably greater than 99.9 percent of the conjugated diene polymer block and 99.5 percent of the vinyl aromatic polymer block segments. The term 'level of hydrogenation' refers to the percentage of the original unsaturated bonds which become saturated upon hydrogenation. The level of hydrogenation in hydrogenated vinyl aromatic polymers is determined using UV-VIS spectrophotometry, while the level of hydrogenation in hydrogenated diene polymers is determined using proton NMR.

The hydrogenated block copolymers of the first and second aspects of the present invention may be rigid, flexible or elastomeric, depending on the relative volumes of hydrogenated conjugated diene polymer and hydrogenated vinyl aromatic polymer block components. The hydrogenated block copolymers are typically rigid when the ratio of hydrogenated conjugated diene to hydrogenated vinyl aromatic is in the range of approximately 0.50 or less. Elastomeric block copolymers result when the ratio of hydrogenated conjugated diene to hydrogenated vinyl aromatic is in the range of approximately 1.5 and higher. Flexible block copolymer generally have ratios somewhere between the rigid and elastomer values.

Anionically polymerized block copolymers typically microphase separate into well-defined morphologies, with morphology dimensions typically ranging from 5 to 50 nanometers in size. Typical morphologies include a continuous matrix phase of one hydrogenated polymer with well-defined spheres, cylinders or gyroids of the minor phase hydrogenated polymer dispersed within the matrix, and a lamellar cocontinuous phase, wherein both hydrogenated polymers are in a continuous phase interspersed within each other. These different morphologies give rise to different physical properties. Hydrogenated block copolymers in which the hydrogenated conjugated diene polymer blocks are continuous are typically elastomeric, highly resilient materials. Conversely, materials in which the hydrogenated vinyl aromatic polymer block segments are the continuous phase are typically stiff, tough plastics. Hydrogenated block copolymers wherein both hydrogenated polymers are cocontinuous tend to have intermediate properties.

The polymers of the first aspect of the present invention have found particular usefulness in producing articles which have excellent balance of useful properties and easy processability. Specific applications which benefit from the advantages of the polymers of the present invention include thermoformed articles, injection molded articles, films, foams, film sheet, foam sheet, extruded articles and other fabricated articles.

Surprisingly, it has been found that the hydrogenated pentablock copolymers of the second aspect of the present invention have significantly improved properties when compared to hydrogenated triblock copolymers of similar molecular weights.

The hydrogenated pentablock copolymers of the third aspect of the present invention have uses in thin wall injection molded articles such as an optical media discs. Discs can be molded using any molding technique such as those described in *The Compact Disc Handbook*, 2nd edition, by Pohlmann.

Methods of molding optical media discs are well known in the art and include injection-compression molding. A preferred method includes injection compression-molding as described in *Injection Molding An Introduction*, pgs. 171–172 Hanser/Gardner/Publication, Inc., Cincinnati, 1995 by Potsch and Michaeli.

It has been discovered that the use of the block copolymers of the third aspect of the present invention are far superior in processability and dimensional stability for applications which have a need for thin walls. The properties required for such compositions in these applications include high flowability and toughness among others. The advantage of such a hydrogenated pentablock system is one of flow and toughness balance.

It is thought, without being bound to such, that this balance of properties is provided by a unique morphology in such pentablock polymers. The use of standard morphological determination techniques such as transmission electron microscopy and small angle X-ray scattering have shown that the copolymers of this invention, when fabricated via typical fabrication methods (injection molded, compression molded, extruded sheet, etc.), do not have well defined morphological features typically found in block copolymers. These typical morphologies with long range order are described in "Block Copolymers-Designer Soft Materials"

by Bates and Fredrickson, *Physics Today*, February, 1999, Vol. 52, No. 2, pgs. 32–38. Hydrogenated pentablocks in this molecular weight and composition range are clearly surprising in that they have excellent mechanical properties such as tensile elongation even though they lack longer-range order and a well defined morphology. In addition, these polymers have superior processability. Rheological analysis of the melt, ramping up temperature at low shear rates, results in elastic modulus decreases that are gradual and continuous, as opposed to the discontinuous decreases due to order-disorder transition typically observed in block copolymers which show longer-range order.

The hydrogenated block copolymers of the third aspect of the present invention are useful in the production of optical media storage devices such as discs, flash memory cards, integrated circuit cards, smart cards, and other media or information-carrying substrates.

In particular, the hydrogenated block copolymers of the third aspect of the present invention are useful in the production of optical storage media devices and components thereof. Optical storage media components include a transparent substrate, a protective layer, a protective case, or an information layer, any of which can comprise the hydrogenated block copolymers of the present invention. Examples of storage media formats which use these devices include prerecorded, recordable and rewriteable versions of CD and DVD formats, optical recording mediums such as those disclosed in U.S. Pat. No. 4,965,114 and U.S. Pat. No. 5,234,792, incorporated herein by reference, all of which are well known in the art and discussed in *The Compact Disc Handbook* 2nd Edition by Pohlmann.

The hydrogenated block copolymers of the third aspect of the present invention can be used to produce the information carrying transparent substrates for both CD (compact disc) and DVD (digital versatile disc) prerecorded formats as, for example, disclosed in U.S. Pat. No. 5,635,114, incorporated herein by reference. In the case of the CD format the transparent substrate is coated with a reflective metal layer, e.g. aluminum, followed by a protective coating, e.g. a U.V. curable lacquer. The DVD structure includes two information carrying substrates, e.g. comprising the hydrogenated pentablock copolymers of the third aspect of the present invention, which are sputtered with an aluminum reflective layers, or gold or silicon semi-reflective layers. The individual substrates are bonded together to form a dual layer disc with an overall thickness equal to the thickness of a CD media device. In order to produce high density pre-recorded DVD formats, stampers are inserted into the mold with track pitch of 0.4 to 0.5 in order to achieve data density of 10 to 20 Gb. High density developmental formats can also use a data carrying thin film layer which is supported by a non-data containing substrate layer in which case either or both media layers can be produced from the hydrogenated pentablock copolymers of the third aspect of the present invention.

Hydrogenated pentablock copolymers of the third aspect are also useful for the production of substrates with a wobbled spiral groove for recordable optical disc formats. The substrate is typically coated with a light absorbing dye layer and then a reflective layer. Examples of reflective layers include gold or silver. During the recording process the dye absorbs heat from the laser beam recorder. The substrate, dye and reflective layer composite structure is deformed by the heat which forms a permanent pit. Signal strength is enhanced by optical change in the dye. Dual layer DVD style media differs from CD format in that two groove containing substrates are bonded together to form a single optical storage device with information stored on two layers.

The following embodiments are representative of optical media applications for hydrogenated pentablock copolymers of the third aspect of the present invention; and are additional aspects to the present invention herein.

In a specific embodiment, one aspect of the present invention is a pre-recorded or recordable optical media disc comprising:

(a') a first substrate layer;

(b') an optional first photosensitive dye layer;

(c') at least one group of the following two reflective or semi-reflective sublayers:
  (i') a first sublayer comprising a metal, an inorganic carbide, or an inorganic nitride;
  (ii') a second sublayer comprising a protective or adhesive composition;

(d') an optional second metal/inorganic layer comprising a metal, an inorganic carbide, or an inorganic nitride;

(e') an optional second photosensitive dye layer;

(f') an optional second substrate layer;
  wherein at least one of the first substrate layer or optional second substrate layer comprises the hydrogenated pentablock copolymer composition of the third aspect of the present invention.

Suitable photosensitive dye layers include photosensitive nitrogen-containing compounds, such as cyanine phthalocyanine, and azo-compounds. Typically, the photosensitive dye layer will be at least 1 microns, preferably at least 10 microns; typically no more than 100 microns preferably no more than 75 microns.

Suitable reflective or semi-reflective metal layers and sublayers include elemental aluminum, silver, or gold. Other suitable reflective or semi-reflective sublayers include silicon compounds such as silicon nitride and silicon carbide. Typically, the reflective or semi-reflective layer or sublayer will be at least 5 nm, preferably at least 10 nm; typically no more than 100 nm, preferably no more than 30 nm in thickness. The metal layer may be applied by cathode sputtering techniques well-known in the art.

Suitable protective compositions include, for example, photocured acrylates (such as polymethylmethacrylate, epoxy acrylates). Such lacquers will include a photoinitiator, such as to result in, e.g., radical curing or cationic UV curing of the lacquer.

Suitable adhesive compositions include hot melt or solvent based adhesives. Such adhesives will typically comprise a polymeric component (e.g., polyethylene, styrene block copolymers (including block copolymers having been hydrogenated along the backbone, such as SBS, SEBS, SPS, SEPS, and SIS), amorphous polyolefins, etc.), in conjunction with one or more additional components selected from the group consisting of waxes, tackifiers, plasticizers, and fillers. The polymeric component may be optionally functionalized, such as to promote adhesion between the adjacent components.

In a specific embodiment, the hydrogenated pentablock copolymers of the third aspect of the present invention are used to produce pre-recorded audio compact discs (CD-audio). Specifications for a compact disc system are well known in the art and disclosed in *The Compact Disc Handbook*, $2^{nd}$ Edition, Pohlmann, pg. 49. The disc diameter is 120 millimeters (mm), the hole diameter is 15 mm and the thickness is 1.2 mm. Data is recorded on an area 35.5 mm wide. The CD substrate comprises the hydrogenated block copolymers of the third aspect of the present invention and is transparent. Data is physically contained in pits which are impressed along its top surface and are covered with a very thin (50 to 100 nanometers) metal such as aluminum, silver or gold. Another thin plastic layer of 10 to 30 micrometers protects the metallized pit surface, on top of which the identifying label is printed.

Another specific embodiment of the present invention is a pre-recorded CD comprising:
(a1) a substrate layer;
(b1) a metal layer, wherein the metal is preferably selected from the group consisting of aluminum, silver, or gold; and
(c1) a lacquer layer;
wherein the substrate comprises the hydrogenated pentablock copolymer of the third aspect of the present invention.

In another specific embodiment, the optical media disc will be a CD-R (recordable), comprising:
(a2) a substrate;
(b2) a photosensitive dye layer;
(c2) a reflective or semi-reflective metal layer; and
(d2) a lacquer.

The substrate, dye layer, metal and lacquer are as described previously.

In another specific embodiment, the optical media disc can be a DVD such as a DVD-5 disk, comprising:
(a3) a first substrate layer;
(b3) a metal layer, preferably selected from the group consisting of gold and silver;
(c3) a lacquer layer; and
(d3) a second substrate layer,
wherein at least one of the first substrate layer or second substrate layer comprises a hydrogenated pentablock copolymer of the third aspect of the present invention.

In another embodiment, the optical media disc will be a DVD-9 disk, comprising:
(a4) a first substrate layer;
(b4) an inorganic carbide or inorganic nitride layer, preferably selected from the group consisting of silica carbide and silica nitride, or alternatively a gold layer;
(c4) a lacquer layer;
(d4) a metal layer, typically aluminum or alloy thereof; and
(e4) a second substrate layer,
wherein at least one of the first substrate layer or second substrate layer comprises a hydrogenated pentablock copolymer of the third aspect of the present invention.

In another embodiment, the optical media disc will be a DVD-14 disc, comprising:
(a5) a first substrate layer;
(b5) an inorganic carbide or inorganic nitride layer, preferably selected from the group consisting of silica carbide and silica nitride, or alternatively a gold layer;
(c5) a lacquer layer;
(d5) at least one group of the following two sublayers:
(i5) a first sublayer comprising a metal, an inorganic carbide, or an inorganic nitride, preferably a metal in each instance, more preferably aluminum or gold in each instance;
(ii5) a second sublayer comprising a protective lacquer or an adhesive composition;
(e5) a second substrate layer;
wherein at least one of the first substrate layer and the second substrate layer comprises a hydrogenated pentablock copolymer of the third aspect of the present invention.

In another embodiment, the optical media disc will be a DVD-18 disc, comprising:
(a6) a first substrate layer;
(b6) a first inorganic carbide or inorganic nitride layer, preferably selected from the group consisting of silica carbide and silica nitride, or alternatively a gold layer;
(c6) a lacquer layer;
(d6) at least two groups of the following two sublayers:
(i6) a first sublayer comprising a metal, an inorganic carbide, or an inorganic nitride, preferably a metal in each instance, more preferably aluminum or gold in each instance;
(ii6) a second sublayer comprising a protective lacquer or an adhesive composition;
(e6) a second inorganic carbide or inorganic nitride layer, preferably selected from the group consisting of silica carbide and silica nitride; and
(f6) a second substrate layer;
wherein at least one of the first substrate layer and the second substrate layer comprises a hydrogenated pentablock copolymer of the third aspect of the present invention.

Metal layers, lacquers and inorganics recited herein, are as previously described herein.

The hydrogenated pentablock copolymers of the third aspect of the present invention can also be used in other CD formats including CD-ROM, CD-I, DVI, CD-V, CD+G/M, mini-discs and CD-3. CD-ROM (Read Only Memory) incorporates nonaudio data, such as data base and software data. CD-I (Interactive) and DVI are specific applications of CD-ROM, wherein data storage includes audio-visual information stored in a user—interactive manner. DVI (Digital Video Interactive) is an all digital optical disc format capable of reproducing full-motion, full-screen video, computer-generated video graphics and digital audio via a CD-ROM drive. CD-V is a combination of audio and video technology which merges the audio with Laservision video format. Other CD formats which can be produced from the composition of the present invention include CD+G/M (Graphics) which is a storage disc for graphics and other nonmusical data. This format takes advantage of the nonaudio data area, wherein still color images, text or other material is stored on an audio compact disc and displayed on a television monitor while the music plays. Another format is CD-3 which is used for applications requiring shorter playing time. The data format is identical to the regular 12 cm diameter CD, but its diameter is only 8 cm and can additionally be used for CD-ROM applications. Photo CD's and CDTV may also be produced from the composition of the present invention. CDTV, which is similar to CD-I, employs the compact disc standard as a basis for multimedia presentations of audio and video including images, graphics, text and animation.

Hydrogenated pentablock copolymers of the third aspect of the present invention can also be used as the transparent substrate and/or the protective layer of a rewritable/erasable disc having one or more layers. In this case the recording layer is sandwiched between a transparent substrate, e.g. comprising the hydrogenated block copolymer of the present invention, and a protective layer. The recording layer is typically approximately 50 nm thick. Recording layers include magneto-optical and phase-change layers. For magneto-optical formats several magnetic materials can be used for recording layers including rare-earth transition metals such as gadolinium terbium iron, terbium iron cobalt, and terbium iron.

In one embodiment, the rewritable/erasable disc comprises:
- (a7) a substrate;
- (b7) a recordable metal layer; and
- (c7) a protective layer.

In particular, the polymers of the present invention will be usefully employed in a rewriteable/erasable optical media disc comprising:
- (a8) a first substrate layer
- (b8) a first inorganic layer;
- (c8) a metal alloy layer;
- (d8) a second inorganic layer;
- (e8) a metal layer;
- (f8) a lacquer layer; and
- (g8) optionally, one or more of an optional second metal layer, an optional third and/or fourth inorganic layer, and optional second metal alloy layer, and an optional second substrate layer,
  - wherein at least one of the first substrate layer and the optional second substrate layer comprises a hydrogenated pentablock copolymer of the third aspect of the present invention.

In another specific embodiment, rewriteable/erasable CD formats can also be produced from the hydrogenated pentablock copolymers of the third aspect of the present invention. In one embodiment, a rewriteable/erasable CD comprises:
- (a8') a substrate;
- (b8') a barrier layer;
- (c8') a magneto optical layer or a phase change layer;
- (d8') a barrier layer;
- (e8') a reflective or semi-reflective metal layer;
- (f8') a lacquer.

The substrate comprises the composition of the third aspect of the present invention. The barrier layer is typically a tin nitride for magneto optical or $ZnS-SiO_2$ for phase change discs. The magneto optical layer is, for example TbFeCo, while the phase change layer is, for example an alloy of TeGeSb. The reflective or semi-reflective layers are as taught previously and are preferably an aluminum alloy. The lacquer typically comprises a photocurable acrylic as taught previously.

Rewritable and erasable DVD formats include DVD-RAM (Random Access Memory), DVD+RW(Rewriteable) and DVD-R/W(Rewriteable) formats which are all based on phase change technology. Phase change technology uses the difference in reflectivity of the low reflectivity amorphous or high reflectivity crystalline state. The phase change alloy is made of tellurium, germanium and antimony (TeGeSb). The active phase change layer is surrounded by two dielectric films ($ZnS-SiO_2$) and covered by an aluminum alloy reflector and protective coating. The difference in reflectivity of the phase change layer is accomplished by heating the layer by laser beam and this becomes the data storage surface.

Additionally, the hydrogenated pentablock copolymers of the third aspect of the present invention can be used to produce a mini-disc. The mini-disc is a 2.5 inch, recordable, erasable, optical disc format, which stores 74 minutes of stereo digital audio. Mini-discs and methods of making are well known to those skilled in the art.

In another embodiment, the hydrogenated pentablock copolymers of the third aspect of the present invention are used to produce digital business cards comprising:
- (a9) a substrate layer,
- (b9) a first metal layer covering at least a portion of the first substrate layer, and
- (c9) a lacquer layer,
  - wherein the substrate layer comprises the hydrogenated pentablock copolymers of the third aspect of the present invention. The metal layer and lacquer layer can be substances as taught previously within this specification. These cards are typically the size of a standard business card, having a thickness of approximately 1.2 mm and contain 40 to 50 megabytes of information.

In another embodiment, the hydrogenated pentablock copolymers of the third aspect of the present invention are used to produce thin film discs as disclosed in U.S. Pat. Nos. 4,356,066 and 4,880,514, incorporated herein by reference, as well as EP-892,393. U.S. Pat. No. 4,356,066 discloses multi-layer magnetic thin film discs comprising a synthetic resin layer on an aluminum-containing substrate and an overlying metallic magnetic layer. In one embodiment of the present invention a thin film disc is produced comprising:
- (a10) a substrate;
- (b10) a synthetic resin layer;
- (c10) at least one thin metal layer which may also serve as a metallic magnetic layer; and
- (d10) optionally, a metallic magnetic layer, if not included in c9).
  - wherein the substrate or synthetic resin layer comprises a hydrogenated pentablock copolymer of the third aspect of the present invention.

In another aspect, thin film magnetic recording members as disclosed in U.S. Pat. No. 4,880,514, herein incorporated by reference, can also be made from the composition of the third aspect of the present invention. In one embodiment, a thin film magnetic recording member comprises:
- (a11) a substrate;
- (b11) a metal layer, such as chromium;
- (c11) a metal alloy recording layer;
  - wherein the substrate comprises a hydrogenated pentablock copolymer of the third aspect of the present invention.

In another embodiment, the hydrogenated pentablock copolymers of the third aspect of the present invention are used to produce smart cards as disclosed in U.S. Pat. No. 6,025,054 and U.S. Pat. No. 5,955,021, which are incorporated herein by reference. Smart cards are small cards the size of a conventional credit card containing an IC (integrated circuit) chip and are used as bankcards, ID cards, telephone cards and the like. They are based upon the use of an electromagnetic coupling (either by physical contact or by electromagnetic waves) between the smart card's electronic components and a card reader or other receiving device. Such cards are usually made by assembling several layers of plastic sheets in a sandwich array. Typically, the smart card comprises:
- (a12) a first substrate layer;
- (b12) a second substrate layer; and
- (c12) a center or core layer comprising a thermosetting polymeric material, having an electronic component embedded therein, that is sandwiched between the first and second substrate layers;
  - wherein all three layers are unified into a body by bonding action between the thermosetting polymeric material used to create the core layer and the materials out of which the first and second substrate layers are made and wherein at least one layer comprises a hydrogenated pentablock copolymer of the third aspect of the present invention. Additionally, the smart card can comprise:

(a13) a substrate layer have an indentation,
(b13) an information-containing microchip retained within the indentation,
  wherein the substrate layer comprises a hydrogenated pentablock copolymer of the third aspect of the present invention.

Methods of making optical media discs are well known in the art and described in *The Compact Disc Handbook* $2^{nd}$ Edition by Pohlmann, and referenced in U.S. Pat. No. 4,911,966 which is herein incorporated by reference.

The high data density optical media discs of the present invention have a retardation of less than 25 nm per 0.6 mm substrate (birefringence of less than 0.000042), and a water absorbance of less than 0.05% as measured according to ASTM D 570. Birefringence Retardation is measured by placing a molded DVD disc substrate between crossed polarizers and quarter wave plates (oriented in opposition). The retardation is measured 20 mm from the injection gate of the disc using light from a 633 nm laser. Transmitted intensity is measured and the retardation calculated using the following formula:

$$I = I0 \sin 2((\pi/\lambda) (\Delta nd))$$

where Retardation=$\Delta nd$

Measured intensity=$I$

Incident intensity=$I0$

Wavelength=$\lambda$

The birefringence is calculated from the measured retardation by dividing retardation by the thickness of the substrate. Preferably the retardation is less than 20 nm, more preferably less than 15 nm and most preferably less than 10 nm in a disc substrate which is 0.6 mm thick. The water absorbance is preferably less than 0.04%, more preferably less than 0.02% and most preferably less than 0.01%.

The following examples are provided to illustrate the present invention. The examples are not intended to limit the scope of the present invention and they should not be so interpreted. Amounts are in weight parts or weight percentages unless otherwise indicated.

EXAMPLES 1–7

Hydrogenated Styrene-Butadiene Block Copolymers

Ia) Styrene-Butadiene Block Copolymers Produced by Sequential Polymerization

A mixture of 386 Kg of cyclohexane containing approximately 8–15 weight percent isopentane is added to a 1136 liter stirred reactor under nitrogen atmosphere. The reactor is blanked by adding 0.5 Kg of a cyclohexane solution which is 0.0979 molar in low molecular weight polystyryl lithium. To this mixture is added 517 g of a 1.4M solution of sec-butyllithium in cyclohexane. The solution is heated to approximately 65° C. and 21.1 Kg of styrene monomer is added, followed by a 34 Kg hydrocarbon solvent purge of the styrene line. After 20 minutes of polymerization, 13.6 Kg of butadiene monomer is added at a temperature of about 70° C., followed by 34 Kg of hydrocarbon solvent which is followed immediately by another styrene addition of 21.1 Kg. After another 20 minutes, a second addition of 13.6 Kg of butadiene is made at about 70° C., followed by a 34 Kg line flush with solvent. After another 20 minutes, the third addition of 21.1 Kg of styrene is made and the polymerization continues for a final 20 minutes. At this point 70 grams of 2-propanol is added to terminate the reaction. Analysis by size exclusion chromatography shows a main peak with a number average molecular weight of 132,000 on a polystyrene calibration basis.

Ib) Styrene-Butadiene Block Copolymers Produced by Chain Coupling 10.8 g of purified styrene monomer is initiated with a 0.00166 M solution of sec-butyllithium and polymerized in 500 mL cyclohexane at 40° C. under an argon atmosphere. After 4 hours, 20 g of purified 1,3-butadiene monomer is added directly to the reactor and polymerization is continued for approximately 12 hours at 40° C. The reaction mixture is then cooled to 8° C., where it is maintained for all subsequent steps. Tetrahydrofuran is added in a ratio of approximately 50:1 (THF: living anion). 10.8 g purified styrene monomer is then added dropwise to the reaction mixture, and the color quickly turns orange. For the purpose of capping polystyrenyllithium anion, a solution of butadiene monomer pre-dissolved in THF is added dropwise until the color turns light green. Based on the mass of butadiene/THF solution added, the polybutadiene capping sequence is 4–6 repeat units long. The coupling agent, α,α'-dichloro-p-xylene/THF solution, is introduced dropwise. The end point is indicated by the disappearance of the light green color characteristic of poly(1,2-butadienyl)lithium anions. The resulting SBSBS pentablock copolymer precursor is recovered by precipitating in methanol.

The compositions of the block copolymers are given in Table I. Two triblocks (SBS) are made by sequential polymerization, and three pentablocks (SBSBS) are prepared using the coupling synthetic methodology. These block copolymers are then hydrogenated such that all of the polybutadiene blocks and polystyrene blocks are completely saturated.

II) Hydrogenation

Approximately 20 grams of dried block copolymer is dissolved in 700 mL cyclohexane. This polymer is hydrogenated using a Pt on $SiO_2$ hydrogenation catalyst as described in U.S. Pat. No. 5,612,422. The polymer to catalyst ratio is 10 to 1. The hydrogenation reaction is conducted in a PPI (Precision Pressure Industry) reactor for 12 hours at 177° C. under 3447 MPa hydrogen.

Table II shows a series of physical properties for the hydrogenated block copolymers. Mechanical properties are obtained using compression molded samples. Tensile properties are measured according to ASTM D638 using type 5 microtensile specimens at a crosshead speed of 0.127cm/min and a 101.9 Kg load cell. Notched izod impact strength is determined according to ASTM D-256, and unnotched izod impact strength is determined according to ASTM method D 4812.

TABLE I

Block Copolymer Compositions Prior to Hydrogenation

| Block Copolymer | Polymerization Method | % PS | % 1,2-butadiene | Mn | Mw/Mn |
|---|---|---|---|---|---|
| 1) SBS-1 | Sequential | 71 | 11.2 | 104,000 | 1.01 |
| 2) SBSBS-1 | Sequential | 70 | 10.2 | 102,000 | 1.003 |
| 3) SBS-2 | Sequential | 55 | — | 75,000 | — |

TABLE I-continued

Block Copolymer Compositions Prior to Hydrogenation

| Block Copolymer | Polymerization Method | % PS | % 1,2-butadiene | Mn | Mw/Mn |
|---|---|---|---|---|---|
| 4) SBS-3 | Sequential | 69 | — | 74,600 | — |
| 5) SBSBS-2 | Coupled | 49 | — | 56,000 | 1.05 |
| 6) SBSBS-3 | Coupled | 70 | — | 68,000 | 1.06 |
| 7) SBSBS-4 | Coupled | 84 | — | 84,000 | 1.04 |

PS = polystyrene
Mn = number average molecular weight as determined by gel permeation chromatography (GPC)
Mw = weight average molecular weight as determined by GPC
S = polystyrene block B = polybutadiene block

TABLE II

Mechanical Properties of Hydrogenated Block Copolymers
Hydrogenated versions of materials in Table I

| Block Copolymer | Tens. Yield Stress (MPa) | % Strain at Yield | Tensile Stress (MPa) | % Elong. At Break | Notched Izod, 73° C. (J/m) | Unnotched Izod, 73° C. (J/m) | Tensile Mod. (GPa) |
|---|---|---|---|---|---|---|---|
| 1) VEV-1[a] | 26.5 | 1.6 | 25.0 | 8.2 | 58.7 | 315 | 2.0 |
| 2) VEVEV-1[a] | 34.7 | 3 | 36.1 | 31 | 74.7 | 566 | 1.6 |
| 2) VEVEV-1[b] | 44.26 | 5.6 | 12.4 | 67 | 283 | 544 | 1.7 |
| 3) VEV-2[c] | 32.1 | 9.9 | 24.0 | 466 | — | — | — |
| 4) VEV-3[c] | — | — | 28.7 | 4.7 | — | — | — |
| 5) VEVEV-2[c] | 26.2 | 14.8 | 35.2 | >745 | — | — | 0.93 |
| 6) VEVEV-3[c] | 29.5 | 4.7 | 35.8 | 70.8 | — | — | 2.0 |
| 7) VEVEV-4[c] | — | — | 37.1 | 5.7 | — | — | 2.4 |

[a]Compression molded at 240° C.
[b]Compression molded at 163° C.
[c]Compression molded at 220° C.
V= hydrogenated polystyrene block
E= hydrogenated polybutadiene block Note although hydrogenated triblock copolymers have good properties, the hydrogenated pentablock copolymers have substantially better practical toughness, higher tensile yield values, and higher elongation at break than triblock materials with equivalent compositions and molecular weights.

is blanked by adding 0.5 Kg of a cyclohexane solution which is 0.0979 molar in low molecular weight polystyryl lithium. To this mixture is added 1.08 liters of a 1.4M solution of sec-butyllithium in cyclohexane. The solution is heated to approximately 65° C. and 22.6 Kg of styrene monomer is added, followed by a 34 Kg hydrocarbon solvent purge of the styrene line. After 20 minutes of polymerization, 11.3 Kg of butadiene monomer is added at a temperature of about 70° C., followed by 34 Kg of hydrocarbon solvent which is followed immediately by another styrene addition of 22.6 Kg. After another 20 minutes, a second addition of 11.3 Kg of butadiene is made at about 70° C., followed by a 34 Kg line flush with solvent. After another 20 minutes, the third addition of 22.6 Kg of styrene is made and the polymerization continues for a final 20 minutes. At this point 114 grams of 2-propanol is added to terminate the reaction.

This general procedure is used to produce Examples 8–11, as listed in Table III, with the only modifications being the percentages of polystyrene and polybutadiene, wherein obtaining such modifications are well known by those skilled in the art.

TABLE III

| Examples | Actual Mp* | Actual Mw/Mn | Actual % Polystyrene before hydrogenation | Actual % Polybutadiene before hydrogenation | Actual % 1,2 Content |
|---|---|---|---|---|---|
| 8 | 62000 | 1.03 | 71 | 29 | 11 |
| 9 | 62000 | 1.01 | 77 | 23 | 10 |
| 10 | 63000 | 1.02 | 80 | 20 | 8 |
| 11 | 61000 | 1.02 | 85 | 15 | 12 |

*Mp is peak Molecular weight as determined by GPC.

EXAMPLE 8–11

I) General Procedure for Preparing Styrene-Butadiene Block Copolymers

Sequential Polymerization of Styrene-Butadiene Pentablock Copolymer

A mixture of 386 Kg of cyclohexane containing approximately 8–15 weight percent isopentane is added to a 1136 liter stirred reactor under nitrogen atmosphere. The reactor These pentablock copolymers are then hydrogenated such that all of the polybutadiene blocks and polystyrene blocks are completely saturated.

II) Hydrogenation

Approximately 20 grams of a dried pentablock copolymer is dissolved in 700 mL cyclohexane. This polymer is hydrogenated using a Pt on $SiO_2$ hydrogenation catalyst as described in U.S. Pat. No. 5,612,422. The polymer to catalyst ratio is 10 to 1. The hydrogenation reaction is conducted in a PPI (Precision Pressure Industry) reactor for 12 hours at 177° C. under 3447 MPa hydrogen.

Table IV shows a series of physical properties for the hydrogenated pentablock copolymers described above. Mechanical properties are obtained using compression molded samples. Tensile properties are measured according to ASTM D638 using type 5 microtensile specimens at a crosshead speed of 0.127 cm/min. and a 101.9 Kg load cell.

TABLE IV

| Ex. | Tensile Yield (MPa) | Tensile Rupture (MPa) | Tensile Modulus (MPa) | Complex Viscosity (poise) | Melt Flow Rate (g/min.) |
| --- | --- | --- | --- | --- | --- |
| 8 | 29.6 | 30.3 | 1,860 | $5.24 \times 10^4$ | — |
| 9 | 29.0 | 29.0 | 1,820 | $1.21 \times 10^4$ | 55 |
| 10 | 30.3 | 31.4 | 2,070 | $2.89 \times 10^3$ | 95 |
| 11 | 31.7 | 31.4 | 2,140 | <1000 | 187 |

The hydrogenated pentablock copolymers exhibit excellent toughness in combination with excellent flow properties.

EXAMPLE 12
CD Example

A CD substrate is injection molded from the hydrogenated block copolymer of Example 8, using an injection molding machine with a maximum clamping force 600 kN, maximum injection stroke capability of 100 mm and injection screw diameter of 32 mm. The substrate mold is a CD single cavity substrate mold. A data bearing stamper is inserted into the mold which contains approximately 0.6 Gb of data and a track pitch of approximately 1.6 microns. Process temperatures are melt temperatures of 290 to 3300 C, and mold temperatures of 30 to 80° C. Injection velocity is varied from 25 mm/s to 125 mm/s, increasing as the mold is filled. Once filled, the part is further packed with polymer by applying initial hold pressure of approximately 600 bar, which is then reduced to 0 bar over a period of 0.3 sec. The polymer injection shot size is approximately 30 mm to achieve a completely full part with an actual part thickness of 1.2 mm. The overall cycle time for the process including part removal is 3–10 seconds. The CD substrate is 120 mm in diameter and 1.2 mm thick.

The CD substrate is inert gas plasma sputtered to deposit a reflective aluminum layer followed by a UV curable lacquer protective layer.

Similarly, a digital business card is produced using the appropriately shaped data stamper in the mold.

EXAMPLE 13
DVD Example

A DVD substrate is injection compression molded from the hydrogenated block copolymer of Example 8, using an injection/compression molding machine with a maximum clamping force 600 kN, maximum injection stroke capability of 100 mm and injection screw diameter of 32 mm. The substrate mold is a DVD single cavity substrate mold. DVD 5 and 9 optical discs are prepared using data bearing stampers which are inserted into the mold which contain approximately 4.7 Gb of data, and a track pitch of approximately 0.74 microns. Process temperatures are melt temperatures of 290 to 330° C., and mold temperatures of 40 to 80° C. Injection velocity is varied from 25 mm/s to 200 mm/s, increasing as the mold is filled. Once filled, the part is further packed with polymer by applying initial hold pressure of approximately 300 bar which is then reduced to 0 bar over a period of 0.8 sec. The polymer injection shot size is approximately 13.5 mm to achieve a completely full part with an actual part thickness of 0.6 mm. The compression phase is accomplished by applying 55–65% clamp force to the injection mold at the time when approximately 85% of the polymer shot has been injected into the mold cavity. Prior to compression the mold cavity is typically between 1.0 and 1.2 mm thick. The overall cycle time for the process including part removal is 5–10 seconds. The DVD substrates are 120 mm in diameter and 0.6 mm thick.

Once molded, the DVD substrates are sputtered with an aluminum reflective layer. Two individual substrates are bonded together to form a dual layer DVD 9 disc.

Similarly, in order to produce high density pre-recorded DVD formats, stampers are inserted into the mold with track pitch of 0.4 to 0.5 in order to achieve data density of 10 to 20 Gb.

EXAMPLE 14
Recordable DVD and CD formats

Recordable versions of both CD and DVD formats are made in similar fashion to the prerecorded formats described above except for the following: the stamper produces a continuous spiral groove of combination of pits and a groove instead of data containing pits. The substrate is then coated with a barrier layer, followed by either a magneto optic layer or a phase change alloy layer. Another barrier layer is applied followed by a reflective layer and finally a protective lacquer layer.

In the case of DVD recordable formats, two data layers are used with a gold semi reflective layer for one data layer and an aluminum reflective layer for the other.

What is claimed is:

1. A hydrogenated block copolymer comprising at least two distinct blocks of hydrogenated vinyl aromatic polymer, and at least one block of hydrogenated conjugated diene polymer, characterized by:
   a) a total number average molecular weight ($Mn_t$) of from 30,000 to 120,000, wherein each hydrogenated vinyl aromatic polymer block (A) has a $Mn_a$ of from 5,000 to 50,000 and the hydrogenated conjugated diene polymer block (B) has a $Mn_b$ of from 4,000 to 110,000; and
   b) a hydrogenation level such that each hydrogenated vinyl aromatic polymer block has a hydrogenation level of greater than 90 percent and the hydrogenated conjugated diene polymer block has a hydrogenation level of greater than 95 percent;
      wherein the hydrogenated block copolymer comprises at least 65 weight percent of hydrogenated vinyl aromatic polymer block, based on the total weight of the block copolymer.

2. The hydrogenated block copolymer of claim 1, wherein at least one hydrogenated vinyl aromatic polymer block comprises hydrogenated polystyrene.

3. The hydrogenated block copolymer of claim 1, wherein at least one hydrogenated conjugated diene polymer block comprises hydrogenated polybutadiene.

4. The hydrogenated block copolymer of claim 3, wherein the hydrogenated polybutadiene is obtained from the hydrogenation of a polybutadiene having at least 40 weight percent 1,2-butadiene content, based on the weight of the polybutadiene block.

5. The hydrogenated block copolymer of claim 3, wherein the hydrogenated polybutadiene is obtained from the hydrogenation of a polybutadiene having less than 40 weight percent 1,2-butadiene content, based on the weight of the polybutadiene block.

6. The hydrogenated block copolymer of claim 1, wherein at least one hydrogenated conjugated diene polymer block comprises hydrogenated polyisoprene.

7. The hydrogenated block copolymer of claim 1, comprising from 10 to 90 weight percent hydrogenated vinyl aromatic polymer, based on the total weight of the hydrogenated block copolymer.

8. The hydrogenated block copolymer of claim 1, comprising from 10 to 90 weight percent hydrogenated conjugated diene polymer, based on the total weight of the hydrogenated block copolymer.

9. A hydrogenated alternating pentablock copolymer having three hydrogenated vinyl aromatic polymer blocks, each having a hydrogenation level of greater than 90 percent and two hydrogenated conjugated diene polymer blocks, each having a hydrogenation level of greater than 95 percent, characterized by:
   a) a total number average molecular weight ($Mn_t$) of from 30,000 to 200,000, wherein each hydrogenated vinyl aromatic polymer block has a $Mn_a$ of from 10,000 to 100,000 and each hydrogenated conjugated diene polymer block has a $Mn_b$ of from 2,000 to 50,000.

10. The hydrogenated alternating pentablock copolymer of claim 9, wherein at least one of the hydrogenated vinyl aromatic polymer blocks comprises hydrogenated polystyrene.

11. The hydrogenated alternating pentablock copolymer of claim 9, wherein at least one of the hydrogenated conjugated diene polymer blocks comprises a hydrogenated polybutadiene.

12. The hydrogenated pentablock copolymer of claim 11, wherein the hydrogenated polybutadiene is obtained from the hydrogenation of a polybutadiene having at least 40 weight percent 1,2-butadiene content, based on the weight of the polybutadiene block.

13. The hydrogenated pentablock copolymer of claim 11, wherein the hydrogenated polybutadiene is obtained from the hydrogenation of a polybutadiene having less than 40 weight percent 1,2-butadiene content, based on the weight of the polybutadiene block.

14. The hydrogenated pentablock copolymer of claim 9, wherein at least one of the hydrogenated conjugated diene polymer blocks comprises hydrogenated polyisoprene.

15. The hydrogenated pentablock copolymer of claim 9, comprising from 10 to 90 weight percent hydrogenated vinyl aromatic polymer, based on the total weight of the hydrogenated pentablock copolymer.

16. A composition comprising a hydrogenated alternating pentablock copolymer of three hydrogenated vinyl aromatic polymer blocks having a hydrogenation level of greater than 90 percent and two hydrogenated conjugated diene polymer blocks having a hydrogenation level of greater than 95 percent, characterized by:
   a) a total number average molecular weight ($Mn_t$) of from 40,000 to 70,000, wherein each hydrogenated vinyl aromatic polymer block has a $Mn_a$ of from 8,700 to 21,000 and each hydrogenated conjugated diene polymer block has a $Mn_b$ of from 2,000 to 12,500;
      the total amount of hydrogenated conjugated diene polymer being from 10 to 35 weight percent of the copolymer based on the combined weights of all blocks.

17. The hydrogenated pentablock copolymer of claim 16, wherein at least one of the hydrogenated vinyl aromatic polymer blocks comprises hydrogenated polystyrene.

18. The hydrogenated pentablock copolymer of claim 16, wherein at least one of the hydrogenated conjugated diene polymer blocks comprises a hydrogenated polybutadiene.

19. The hydrogenated pentablock copolymer of claim 18, wherein the hydrogenated polybutadiene block is obtained from the hydrogenation of a polybutadiene block having at least 40 weight percent 1,2-butadiene content, based on the weight of the polybutadiene block.

20. The hydrogenated pentablock copolymer of claim 18, wherein the hydrogenated polybutadiene block is obtained from the hydrogenation of a polybutadiene block having less than 40 weight percent 1,2-butadiene content, based on the weight of the polybutadiene block.

21. The hydrogenated pentablock copolymer of claim 16, wherein at least one of the hydrogenated conjugated diene polymer blocks comprises hydrogenated polyisoprene.

22. A thin wall injection molded article prepared from the composition of claim 16.

23. An optical media disc prepared from the composition of claim 16.

24. The optical media disc of claim 23 which is a recordable or pre-recorded optical media disc.

25. A recordable or pre-recorded optical media disc comprising:
   (a') a first substrate layer
   (b') an optional first photosensitive dye layer;
   (c') at least one group of the following two sublayers:
      (i) a first sublayer comprising a metal selected from the group consisting of gold, silver, aluminum or alloys thereof;
      (ii) a second sublayer comprising a lacquer;
   (d') an optional second metal layer;
   (e') an optional second photosensitive dye layer
   (f') an optional second substrate layer;
      wherein at least one of the first substrate layer or optional second substrate layer comprises the composition of claim 16.

26. An optical media disc, which is a pre-recorded compact disc comprising:
   (a1) a substrate;
   (b1) a metal layer, wherein the metal is selected from the group consisting of aluminum, silver, gold or alloys thereof; and
   (c1) a lacquer layer;
      wherein the substrate comprises the composition of claim 16.

27. A CD-R optical media disc, comprising:
   (a2) a substrate;
   (b2) a photosensitive dye layer;
   (c2) a reflective or semi-reflective metal layer; and
   (d2) a lacquer;
      wherein the substrate comprises the composition of claim 16.

28. The optical media disc of claim 11 which is a digital versatile disc (DVD).

29. A DVD-5 disk, comprising:
   (a3) a first substrate layer;
   (b3) a metal layer, selected from the group consisting of gold, aluminum, silver and alloys thereof;
   (c3) a lacquer layer; and
   (d3) a second substrate layer,
      wherein at least one of the first substrate layer or second substrate layer comprises the composition of claim 16.

30. A DVD-9 disk, comprising:
   (a4) a first substrate layer;
   (b4) an inorganic carbide or inorganic nitride layer, selected from the group consisting of silica carbide and silica nitride, or alternatively a gold layer;

(c4) a lacquer layer;
(d4) a metal layer; and
(e4) a second substrate layer,
  wherein at least one of the first substrate layer or second substrate layer comprises the composition of claim 16.

31. A DVD-14 disc, comprising:
(a5) a first substrate layer;
(b5) an inorganic carbide or inorganic nitride layer, selected from the group consisting of silica carbide and silica nitride, or alternatively a gold layer;
(c5) a lacquer layer;
(d5) at least one group of the following two sublayers:
  (i5) a first sublayer comprising a metal, an inorganic carbide, or an inorganic nitride;
  (ii5) a second sublayer comprising a protective lacquer or an adhesive composition;
(e5) a metal layer; and
(f5) a second substrate layer;
  wherein at least one of the first substrate layer and the second substrate layer comprises the composition of claim 16.

32. A DVD-18 disc, comprising:
(a6) a first substrate layer;
(b6) a first inorganic carbide or inorganic nitride layer, selected from the group consisting of silica carbide and silica nitride, or alternatively a gold layer;
(c6) a lacquer layer;
(d6) at least two groups of the following two sublayers:
  (i6) a first sublayer comprising a metal, an inorganic carbide, or an inorganic nitride;
  (ii6) a second sublayer comprising a protective lacquer or an adhesive composition;
(e6) a second inorganic carbide or inorganic nitride layer, selected from the group consisting of silica carbide and silica nitride, or alternatively a gold layer; and
(f6) a second substrate layer;
  wherein at least one of the first substrate layer and the second substrate layer comprises the composition of claim 16.

33. The optical media disc of claim 24 which is a CD-ROM, CD-I, CD-V, CD-R, CD+G/M, CD-3, photo CD or CDTV.

34. A rewritable/erasable disc comprising:
(a7) a substrate;
(b7) a recordable metal layer; and
(c7) a protective layer;
  wherein the substrate comprises the composition of claim 16.

35. A rewriteable/erasable optical media disk comprising:
(a8) a first substrate layer
(b8) a first inorganic layer;
(c8) a metal alloy layer;
(d8) a second inorganic layer;
(d8) a metal layer;
(e8) a lacquer layer; and
(f8) optionally, one or more of an optional second metal layer, an optional third and/or fourth inorganic layer, and optional second metal alloy layer, and an optional second substrate layer,
  wherein at least one of the first substrate layer and the optional second substrate layer comprise the composition of claim 16.

36. A rewriteable/erasable CD comprising:
(a8') a substrate;
(b8') a barrier layer;
(c8') a magneto optical layer or a phase change layer;
(d8') a barrier layer;
(e8') a reflective or semi-reflective metal layer;
(f8') a lacquer;
  wherein the substrate comprises the composition of claim 16.

37. The optical media disc of claim 23, wherein the disc is a mini-disc.

38. A thin film disc comprising,
(a10) a substrate;
(b10) a synthetic resin layer;
(c10) at least one thin metal layer which may also serve as a metallic magnetic layer; and
(d10) optionally, a metallic magnetic layer;
  wherein the substrate or synthetic resin layer comprises the composition of claim 16.

39. A thin film disc comprising
(a11) a substrate;
(b11) a metal layer; and
(c11) a metal alloy recording layer;
  wherein the substrate comprises the composition of claim 16.

40. A digital business card comprising:
(a9) a substrate layer comprising a composition of claim 16,
(b9) a first metal layer covering at least a portion of the first substrate layer, and
(c9) a lacquer layer.

41. A smart card comprising:
(a12) a first substrate layer;
(b12) a second substrate layer; and
(c12) a center or core layer comprising a thermosetting polymeric material, having an electronic component embedded therein, wherein the center or core layer is sandwiched between the first and second substrate layers;
  wherein at least one layer comprises the composition of claim 16; or
    (a13) a substrate layer comprising the composition of claim 16, have an indentation; and
    (b13) an information-containing microchip retained within the indentation.

* * * * *